M. J. DEEGAN.
DIFFERENTIAL GEARING.
APPLICATION FILED APR. 7, 1913.
1,162,754.
Patented Dec. 7, 1915.
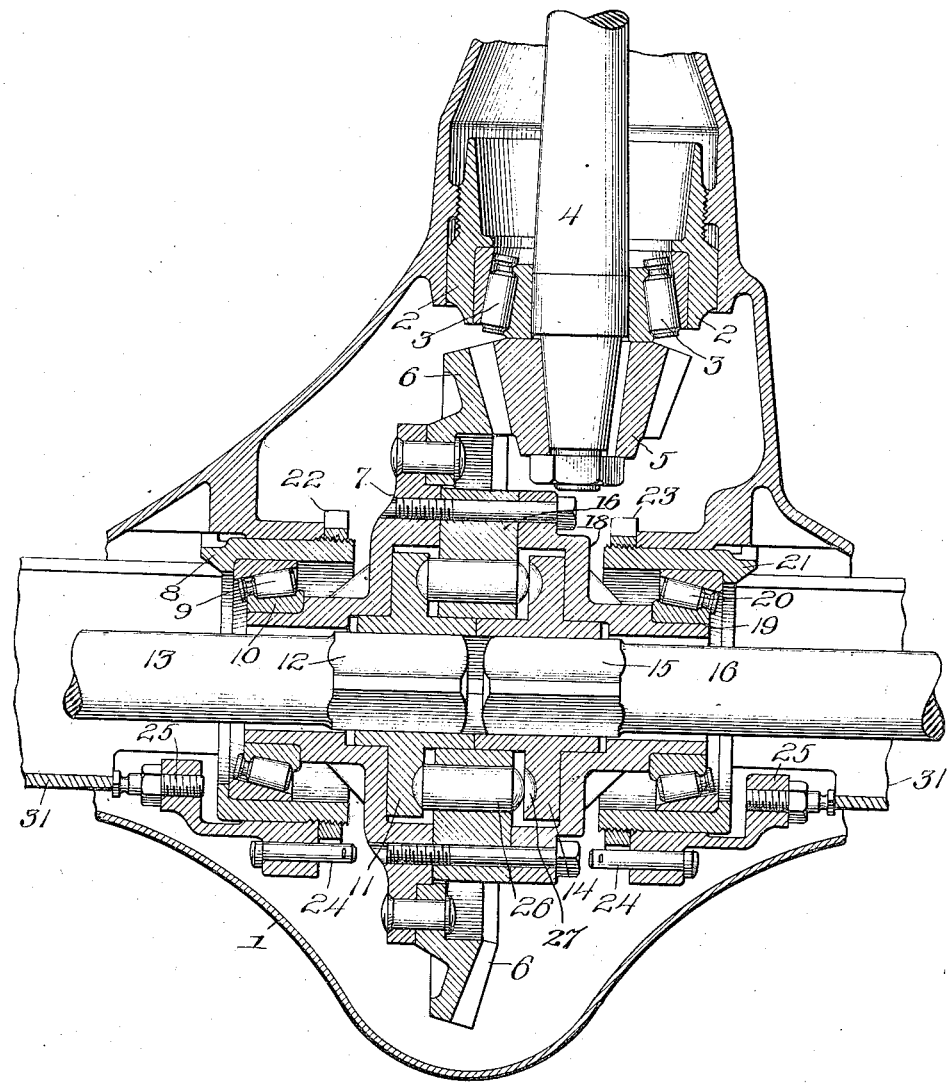
Inventor
Michael J. Deegan

UNITED STATES PATENT OFFICE.

MICHAEL J. DEEGAN, OF DETROIT, MICHIGAN.

DIFFERENTIAL GEARING.

1,162,754.   Specification of Letters Patent.   Patented Dec. 7, 1915.

Application filed April 7, 1913. Serial No. 759,425.

*To all whom it may concern:*

Be it known that I, MICHAEL J. DEEGAN, a citizen of the United States of America, residing at Detroit, in the county of Wayne and State of Michigan, have invented certain new and useful Improvements in Differential Gearing, of which the following is a specification, reference being had therein to the accompanying drawings.

It is customary in the construction of differential gearing and more especially that used in driving traction bearing wheels of motor vehicles to use intermediate beveled gears or the like for imparting motion to the two parts of the differential drive shaft common in such structures. This necessitates the use of elements for maintaining the gearing in accurate alinement, for lubricating them and for minimizing the loss of power which is co-incident with the use of such mechanism.

This invention relates to differential gearing and to an arrangement thereof whereby all intermediate gears are eliminated and a consequent loss of power and complexity of structure is greatly reduced.

The invention consists in the matters hereinafter set forth and pointed out in the appended claims.

The drawing is a view in longitudinal section, partially broken away and in elevation, of a mechanism that embodies features of the invention.

As herein shown in preferred form a main casing 1 has a bearing 2 of any preferred type, herein shown with anti-friction rolls 3 for taking up end as well as side thrust, in which a main driving shaft 4 is mounted. A main driving gear 5 on the shaft meshes with the correspondingly beveled pinion 6.

A barrel 7 to the flange of which the pinion 6 is secured or on which it is formed is rotatable in a bearing indicated at 8, which, while of any preferred type, is herein shown with anti-friction rolls engaging an annular race-way on the barrel. A driving plate 11 rotatably mounted in a counterbored recess in the barrel 7 engages the squared, keyed or splined end portion 12 of one member 13 of a differential follower shaft. An oppositely disposed companion plate 14 engages the adjacent squared, keyed or splined portion 15 of a second member 16 of the differential follower shaft. Preferably the plates 11 and 14 have hubs which abut. A driving ring 16 which is journaled on the proximate end portions of the members 11 and 14 and is nonrotatably secured in any suitable manner to the barrel 7, also carries a bonnet 18 in the counterbored face of which the plate 14 is journaled, the bonnet itself having a raceway 19 by which it is mounted rotatably on the rolls 20 of a bearing 21 which is companion to the bearing 8. Both the latter bearings, which obviously may be of any suitable type, are provided with adjusting means to take up for wear, as for example, thrust rings 22 and 23 which may be locked in adjusted position on the portions of the casing 1 in which the bearings are mounted, as by pins 24. An end thrust adjustment indicated at 25 may likewise be provided for each, if desired, abutting the end portions of the sleeves 31 which form the axle housing, the ring 16, barrel 7 and bonnet 18 being secured together in any suitable manner to rotate as a driving unit.

A series of longitudinally reciprocable sliding members 26 or dogs are mounted in the driving plates 16 with their projecting end faces so disposed that they engage the recesses in the face of the member 11 when projected in one direction or with corresponding depressions indicated at 27 in the face of the member 14 when shifted in the opposite direction, their length being such that when fully seated in the recesses of one plate, their outer end portions are in sliding contact with the face of the opposite plate.

In operation, power imparted to the gearing rotates the pinion and thereby the driving ring. The sliding members or dogs in the latter engage and drive the follower plates and consequently the two members of the differential follower shaft, being shifted from one to the other if either of the shafts is retarded, the driving effect on the two shafts being similar to that of the conventional differential gearing train.

As a result of this construction the friction and consequent loss of power of the ordinary gearing train is done away with, together with the necessity of means for keeping the members in such train in accurate alinement. The adjustments are simple and lubrication is easily provided for. The mechanism as a whole can be dismounted readily and as it is compact the size and weight of the exterior casing is reduced beyond the limits of the casing required for a conventional mechanism.

Obviously, changes in the details of construction may be made without departing from the spirit of my invention and I do not care to limit myself to any particular form or arrangement of parts.

What I claim is:—

1. In a differential gearing, the combination with a two part shaft, a driven barrel in concentric relation to and normally free of one of the shaft parts, and a bonnet secured to said barrel to rotate therewith and normally free of the other shaft part, of a pair of driving plates housed by said bonnet and barrel and having hubs with abutting portions each secured on a shaft part, said plates having the entire area of the outer faces thereof engaging said bonnet and said barrel and the confronting faces thereof set in from the edges of said bonnet and said barrel and provided with recesses, a driving ring of the same width throughout and of less width than the combined lengths of said abutting hub portions secured between said barrel and said bonnet and confronting said driving plates in spaced relation thereto and revoluble upon the abutting hub portion, said driving ring having transverse openings therein contiguous to the hub of said driving plates and adapted to axially aline with the recesses of said driving plates, and a cylindrical member longitudinally reciprocal in each of the openings of said driving ring and adapted to engage in the recesses of said driving plates and be shifted in said driving ring when a movement of one driving plate varies relative to the movement of the other.

2. In a differential gearing, the combination of a two-part shaft, a driven barrel in concentric relation to and normally free of one of the shaft parts, and a bonnet secured to said barrel to rotate therewith, and normally free of the other shaft part, of a pair of driving plates housed by said bonnet and barrel and having hubs with abutting portions each secured on a shaft part, said plates having the outer faces thereof engaging said bonnet and said barrel and the confronting faces thereof provided with recesses, a driving ring of the same width throughout and of less width than the combined lengths of said abutting hub portions secured between said barrel and said bonnet and confronting said driving plates in spaced relation thereto and revoluble upon the abutting hub portions, said driving ring having transverse openings therein contiguous to the hub of said driving plates and adapted to axially aline with the recesses of said driving plates, and a member longitudinally reciprocal in each of the openings of said driving ring and adapted to engage in the recesses of said driving plates and be shifted in said driving ring when a movement of one driving plate varies relative to the movement of the other.

In testimony whereof I affix my signature in presence of two witnesses.

MICHAEL J. DEEGAN.

Witnesses:
OTTO F. BARTHEL,
ANNA M. DORR.